US012451313B2

(12) United States Patent
Patwardhan et al.

(10) Patent No.: US 12,451,313 B2
(45) Date of Patent: Oct. 21, 2025

(54) CURRENT INTERRUPTING MODULE WITH A RESETTABLE CURRENT INTERRUPTION DEVICE

(71) Applicant: Eaton Intelligent Power Limited, Dublin (IE)

(72) Inventors: Gaurav Patwardhan, Aurangabad (IN); Lalit K. Patil, Nashik (IN); Puneet Lanjekar, Nasik (IN); Mahesh Balakrishna Varrier, Kozhikode (IN); Ashish Kumar, Patna (IN)

(73) Assignee: Eaton Intelligent Power Limited, Dublin (IE)

( * ) Notice: Subject to any disclaimer, the term of this patent is extended or adjusted under 35 U.S.C. 154(b) by 552 days.

(21) Appl. No.: 17/706,818

(22) Filed: Mar. 29, 2022

(65) Prior Publication Data

US 2022/0328271 A1 Oct. 13, 2022

Related U.S. Application Data

(60) Provisional application No. 63/171,742, filed on Apr. 7, 2021.

(51) Int. Cl.

| | |
|---|---|
| ***H01H 71/66*** | (2006.01) |
| ***H01H 71/50*** | (2006.01) |
| ***H01H 71/60*** | (2006.01) |

(52) U.S. Cl.

CPC ............ *H01H 71/66* (2013.01); *H01H 71/50* (2013.01)

(58) Field of Classification Search

CPC ............. H01H 33/6606; H01H 33/666; H01H 33/6662; H01H 2033/6667; H01H 1/5866;

(Continued)

(56) References Cited

U.S. PATENT DOCUMENTS 3,597,713 A * 8/1971 McClain ................ H01H 73/38 361/115
4,384,185 A * 5/1983 Hall ....................... H01H 33/56 218/43

(Continued)

FOREIGN PATENT DOCUMENTS

DE 102017206929 A1 10/2018
DE 102018204847 B3 9/2019

(Continued)

OTHER PUBLICATIONS

Gunther Socher, European International Searching Authority, International Search Report and Written Opinion, counterpart PCT Application No. PCT/EP2022/025126, mailed Oct. 11, 2022, 14 pages total.

(Continued)

*Primary Examiner* — William A Bolton

(74) *Attorney, Agent, or Firm* — DiBerardino McGovern IP Group LLC

(57) ABSTRACT

A current interruption module includes: a resettable switching apparatus associated with operating states, the operating states including at least a first operating state that prevents current flow in the switching apparatus and a second operating state that allows current flow in the switching apparatus; a switch control configured to control the operating state of the switching apparatus; an electrical interface configured to electrically connect the switching apparatus to a load; and a connection interface configured to electrically connect the resettable switching apparatus to a current path of an separate and distinct electrical connector and to mechanically connect the current interruption module to the separate and distinct electrical connector.

20 Claims, 8 Drawing Sheets

(58) Field of Classification Search
CPC ........ H01H 71/66; H01H 71/50; H01H 85/54; H01H 2085/0486; H01H 33/66; H02B 13/0354
USPC ................. 218/118, 120, 134, 137–142, 155
See application file for complete search history.

(56) References Cited

U.S. PATENT DOCUMENTS

| | | | | |
|---|---|---|---|---|
| 5,583,729 | A | 12/1996 | Hassler et al. | |
| 5,912,604 | A * | 6/1999 | Harvey | H01H 33/6662 218/138 |
| 6,723,940 | B1 | 4/2004 | Book et al. | |
| 6,753,493 | B2 | 6/2004 | Rhein et al. | |
| 6,927,356 | B2 * | 8/2005 | Sato | H01H 33/666 218/120 |
| 7,215,228 | B2 | 5/2007 | Rhein | |
| 8,334,738 | B2 | 12/2012 | Smith et al. | |
| 8,729,416 | B2 * | 5/2014 | Bullock | H01H 33/6662 218/118 |
| 8,941,960 | B2 * | 1/2015 | Murray | H01H 75/06 361/72 |
| 9,837,229 | B2 * | 12/2017 | Chaly | H01H 47/325 |
| 9,905,348 | B2 * | 2/2018 | Kim | H01H 33/6662 |
| 2005/0082260 | A1 | 4/2005 | Martin | |
| 2015/0116878 | A1 | 4/2015 | Richard et al. | |
| 2020/0111631 | A1 * | 4/2020 | Hanna | H01H 33/14 |
| 2020/0118776 | A1 * | 4/2020 | Kowalyshen | H01H 33/6662 |
| 2020/0335293 | A1 * | 10/2020 | Goldman | H01H 33/008 |

FOREIGN PATENT DOCUMENTS

| | | | |
|---|---|---|---|
| EP | 1367681 | A1 | 12/2003 |
| EP | 2306482 | A1 | 4/2011 |
| KR | 20150001243 | U | 3/2015 |

OTHER PUBLICATIONS

Pia Dahl, European International Searching Authority, Invitation to Pay Fees and Partial International Search Report and Written Opinion, counterpart PCT Application No. PCT/EP2022/025126, mailed Jul. 11, 2022, 12 pages total.

* cited by examiner

CURRENT INTERRUPTING MODULE WITH A RESETTABLE CURRENT INTERRUPTION DEVICE

CROSS-REFERENCE TO RELATED APPLICATION

This application claims the benefit of U.S. Provisional Application No. 63/171,742, filed on Apr. 7, 2021 and titled CURRENT INTERRUPTING MODULE WITH A RESETTABLE CURRENT INTERRUPTION DEVICE, which is incorporated herein by reference in its entirety.

TECHNICAL FIELD

This disclosure relates to a current interrupting module with a resettable current interruption device. The current interrupting module is configured for connection to a separate and distinct electrical connector.

BACKGROUND

An electrical connector is used to connect electrical transmission and distribution equipment and electrical sources within a medium-voltage or a high-voltage electrical system. An electrical connector generally includes a fuse element that is activated in the presence of a fault condition. The fuse element and the electrical connector are typically unusable after activation of the fuse element.

SUMMARY

In one aspect, a current interruption module includes: a resettable switching apparatus associated with operating states, the operating states including at least a first operating state that prevents current flow in the switching apparatus and a second operating state that allows current flow in the switching apparatus; a switch control configured to control the operating state of the switching apparatus; an electrical interface configured to electrically connect the switching apparatus to a load; and a connection interface configured to electrically connect the resettable switching apparatus to a current path of an separate and distinct electrical connector and to mechanically connect the current interruption module to the separate and distinct electrical connector.

Implementations may include one or more of the following features.

The current interruption module also may include a dielectric body that encases the support structure, the resettable switching apparatus, and the switch control.

The resettable switching apparatus may include a vacuum interrupter. The switch control may include an actuator configured to move a moveable contact of the vacuum interrupter relative to a stationary contact of the vacuum interrupter to control the operating state of the vacuum interrupter. The actuator may include an electromagnetic actuator and a push rod, and the push rod may be connected to the electromagnetic actuator and the moveable contact.

The current interruption module also may include a power apparatus configured to provide electrical energy to the switch control. The current interruption module also may include a support structure configured to hold the switch control, the resettable switching apparatus, and the power apparatus. The support structure may include a rigid support structure.

The current interruption module also may include an electronic control configured to control the switch control apparatus. The electronic control may be configured to communicate with an electronic device that is separate from the apparatus. The current interruption module also may include a current sensor configured to measure a property of electrical current that flows in the resettable switching apparatus.

The current interruption module also may include a support structure, and the resettable switching apparatus and the switch control may be attached to the support structure.

In another aspect, a system includes: an electrical connector including: a mechanical interface at a first end of the electrical connector, the mechanical interface configured to mechanically attach the electrical connector to a bushing; a current path that passes through the electrical connector from the first end to a second end of the electrical connector; and a fuse mechanism on the current path. The system also includes a switching module that includes a switching apparatus configured to repeatedly change between at least a first operating state and a second operating state. The switching module is configured to be attached to and removed from the second end of the electrical connector, and when the switching module is attached to the second end of the electrical connector, the switching apparatus is electrically connected to the current path.

Implementations may include one or more of the following features.

The fuse mechanism may include one or more metal oxide varistors (MOVs).

The switching module may include a vacuum interrupter.

The electrical connector may be a load break electrical connector. The load break electrical connector may be an elbow electrical connector.

In some implementations, the switching module also includes: a switch control apparatus configured to control the operating state of the switching apparatus; and a power apparatus configured to obtain electrical energy from the current path and to provide electrical energy to the switch control apparatus. The switching module also may include an electronic control configured to control the switch control apparatus. The system also may include a current sensor configured to measure a property of electricity in the current path, and the electronic control may be further configured to control the switch control apparatus based on the measured property.

Implementations of any of the techniques described herein may include a system, an assembly, a current interruption module, a kit that includes an electrical connector and a current interrupting module, a control system, and/or a method. The details of one or more implementations are set forth in the accompanying drawings and the description below. Other features will be apparent from the description and drawings, and from the claims.

DRAWING DESCRIPTION

DETAILED DESCRIPTION

Figure 1A:
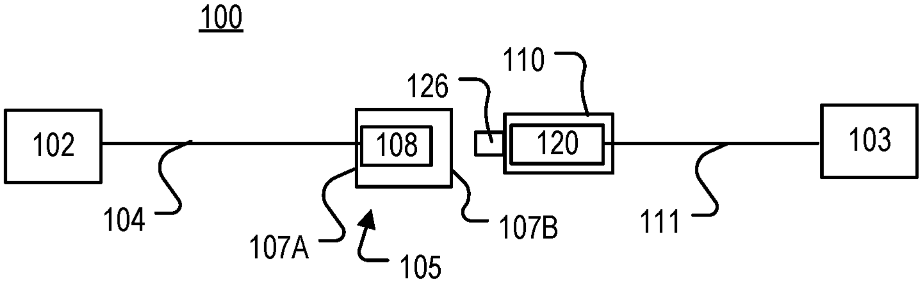
FIGS. 1A and 1B are block diagrams of an example of an electrical power system.
Figure 1B:
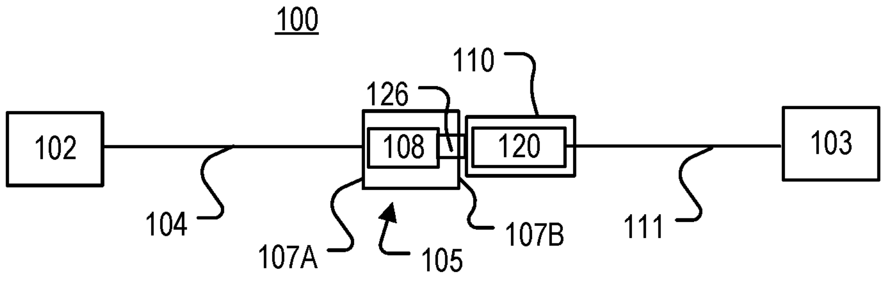

FIGS. 1A and 1B are block diagrams of an alternating current (AC) electrical power system 100. The electrical power system 100 may be, part of, for example, an electrical grid, an electrical system, or a multi-phase electrical network that distributes electricity to industrial, commercial, and/or residential customers. The electrical grid may have an operating voltage of, for example, at least 1 kilovolt (kV), 12 kV, up to 34.5 kV, up to 38 kV, or 69 kV or higher, and may operate at a system frequency of, for example, 50 or 60 Hertz (Hz). All of portions of the grid may be underground.

Figure 1C:
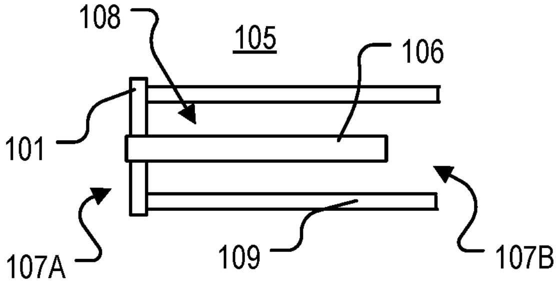
FIG. 1C is a cross-sectional view of an example of an electrical connector that may be used in the system of FIGS. 1A and 1B.
Figure 1D:
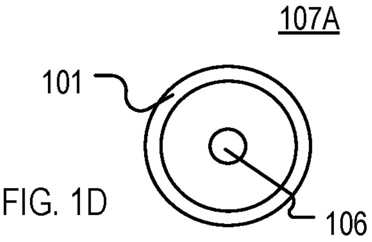
FIGS. 1D and 1E are views of ends of the electrical connector of FIG. 1C.
Figure 1E:
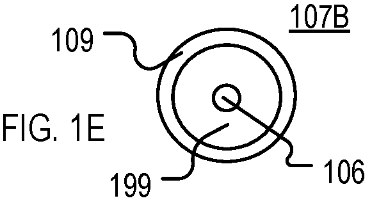

The electrical power system 100 includes an electrical connector 105 and a current interrupting module 110 that is attachable to and removable from the electrical connector 105. FIG. 1A shows the current interrupting module 110 and the electrical connector 105 in a disconnected state. FIG. 1B shows the current interrupting module 110 and the electrical connector 105 in an attached state. FIG. 1C is a side cross-sectional view of the electrical connector 105. FIGS. 1D and 1E show the ends 107A and 107B, respectively, of the electrical connector 105.

The electrical connector 105 includes a current path 108. The current path 108 includes one or more electrically conductive elements, but the current path 108 lacks a resettable current interrupting device. In the example of FIGS. 1A-1E, the current path 108 includes a non-resettable current interrupting device 106. A non-resettable current interrupting device is capable of conducting electrical current and interrupting electrical current but is not capable of being reset or controlled back to a state in which the device conducts current. Non-resettable current interrupting devices generally must be replaced after interrupting current. Fuses and metal-oxide varistors (MOVs) are examples of non-resettable current interrupting devices.

On the other hand, the current interrupting module 110 includes a resettable current interrupting device 120. A resettable current interrupting device is capable of conducting current and interrupting current, and is also capable of being reset or controlled to conduct current after interruption. A vacuum interrupter is an example of a resettable current interrupting device. As discussed in greater detail below, the current interrupting module 110 provides resettable current interrupting functionality to a legacy electrical connector that lacks a resettable current interrupting device.

Figure 7:
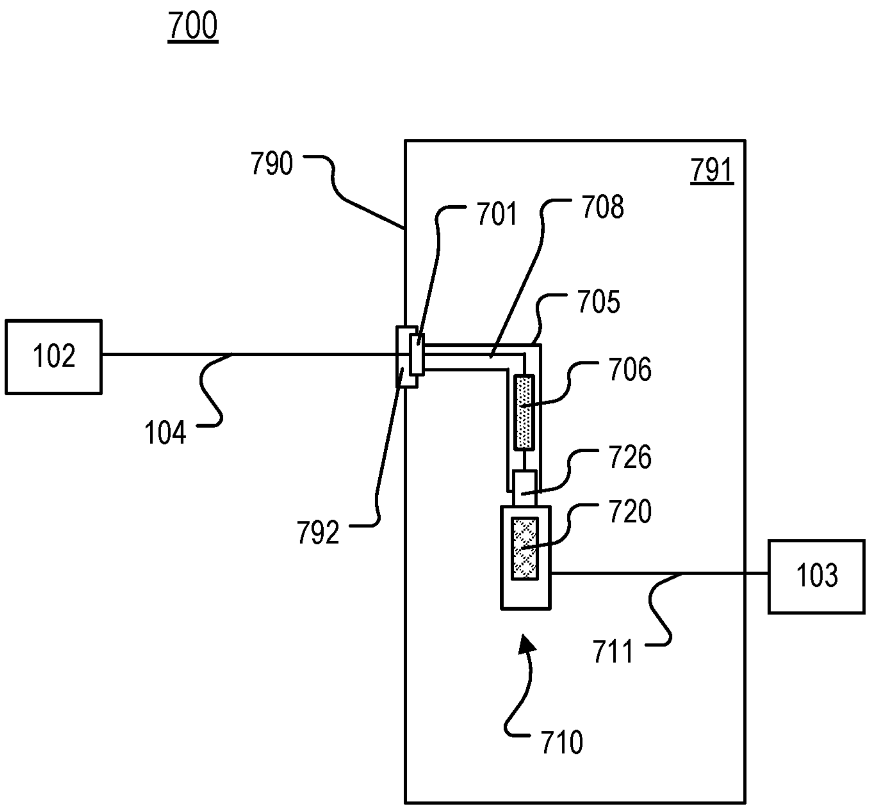
FIG. 7 is a block diagram of an example of a utility cabinet.

The electrical connector 105 is a three-dimensional body. In the example of FIG. 1C-1E, the electrical connector 105 is cylindrically shaped. The electrical connector 105 includes a housing or exterior 109. The exterior 109 may be a molded, peroxide-cured EPDM or other electrically insulating material. The exterior 109 extends from an end 107A to an end 107B. The electrical connector 105 also includes a bushing 101 at the end 107A. The bushing 101 is used to mechanically attach the electrical connector 105 to a bushing on a utility structure (such as a wall of a cabinet). FIG. 7 shows an example of a utility structure. When the bushing 101 is mounted to the utility structure, the current path 108 and the non-resettable current interrupting device 106 are electrically connected to the distribution path 104. The end 107B is an open recess 199 that has a circular cross section. The electrical connector 105 may include additional elements inside the housing 109. For example, the current path 108 may include one or more electrical conductors that are electrically connected to the non-resettable current interrupting device 106.

The electrical connector 105 is shown as an example. Any type of insulated connector that is used to connect a load to a high-voltage or medium-voltage electrical distribution network may be used as the electrical connector 105. For example, the electrical connector 105 may be used to connect an underground load-side cable and a load to a transformer, a sectionalizing cabinet, or a junction. The electrical connector 105 may be a cable connector, a loadbreak connector, a deadbreak connector, an elbow arrester, an elbow loadbreak connector, or a T-shaped loadbreak connector, just to name a few. The electrical connector 105 is a relatively compact device that an operator can position and install manually, and the electrical connector is generally small and light enough to be manually moveable, with, for example, a hotstick. The electrical connector 105 may have a current rating of 200 Amperes (A), 600 A, between 200 A and 600 A, or greater than 600 A. The electrical connector 105 may be configured to have an AC operating voltage of, for example, 15 kilovolts (kV), 25 kV, 35 kV, or greater.

The power system 100 also includes a source 102 that is electrically connected to the current path 108 via the distribution path 104. The distribution path 104 is any type of mechanism or device that carries electricity. For example, the distribution path 104 may be one or more transmission lines, electrical cables, electrical wires, transformers, or a combination of such devices. The source 102 is any device capable of providing AC electricity to the distribution path 104. For example, the source 102 may be a generator, a substation, a renewable energy source, a capacitor bank, a transformer, a power station, or any other type of electrical equipment that generates and/or transfers electrical energy.

The current path 108 of the electrical connector 105 is also electrically connected to a load 103. The load 103 is any type of device that utilizes, produces, and/or stores electricity. For example, the load 103 may be machinery, a lighting system, one or more motors, a transformer, or a combination of such devices. The load 103 may be a device that is capable of producing, consuming, and/or storing electricity. For example, the load 103 may be a battery.

In a traditional or legacy configuration of the system 100 that does not include the current interrupting module 110, the current path 108 of the electrical connector 105 is directly connected to a load-side cable 111, which is electrically connected to the load 103. The load-side cable 111 is any type of device that is capable of transferring electricity, such as, for example, an electrical wire or electrical cable. Under ordinary operating conditions, electricity flows between the source 102 and the load 103 through the distribution path 104, the current path 108 of the electrical connector 105, and the load-side cable 111. When a fault occurs, the non-resettable current interrupting device 106 in the electrical connector 105 opens to stop the flow of electricity. For example, the non-resettable current interrupting device 106 may be a metal fuse that melts when fault current having an amplitude that is greater than the current rating of the fuse flows in the electrical connector 105. After the fuse melts, the current path 108 of the electrical connector 105 is no longer able to conduct current and the fuse or the electrical connector 105 must be replaced to restore electricity the load 103.

On the other hand, in the configuration of the system 100 shown in FIG. 1B, a connection interface 126 electrically and mechanically connects the current interrupting module 110 to the current path 108 of the electrical connector 105. The current interrupting module 110 is also electrically connected to the load-side cable 111. When a fault condition occurs, the current interrupting module 110 opens such that current cannot pass through the current interrupting module 110, and the load 103 is disconnected from the source 102. After the fault condition passes or is resolved, the current interrupting module 110 closes to reconnect the load 103 to the source 102. Additionally, the current interrupting module 110 may be configured to open before the non-resettable current interrupting device 106 in the electrical connector 105 activates such that the electrical connector 105 may continue to be used after the fault condition is resolved.

FIGS. 2, 3A, 3B, 4A, 4B, 5A, and 5B relate to example implementations of a current interrupting module.

Figure 2:
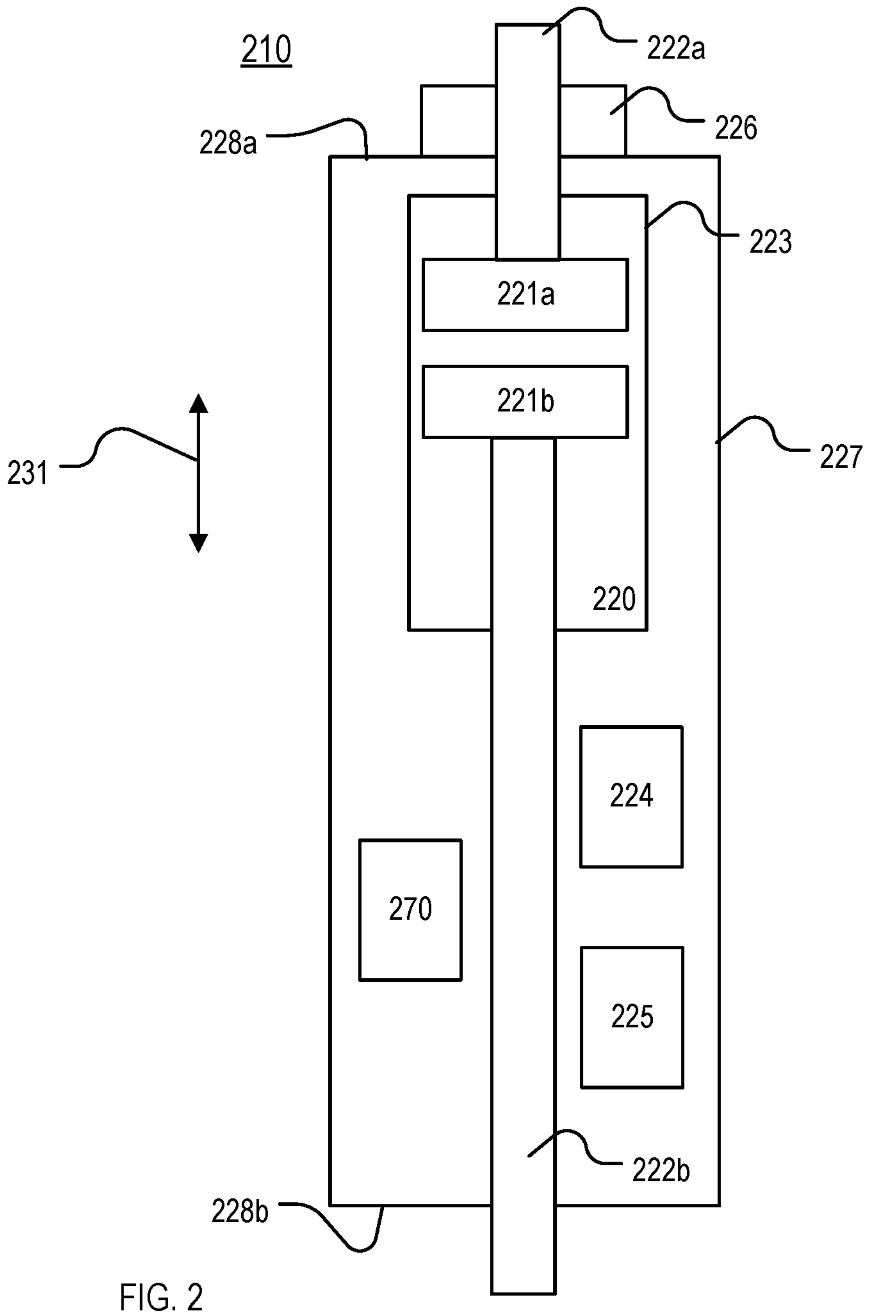
FIG. 2 is a cross-sectional view of an example of a current interrupting module.

FIG. 2 is a cross-sectional block diagram of a current interrupting module 210. The current interrupting module 210 is an example of an implementation of the current interrupting module 110 (FIGS. 1A and 1B). The current interrupting module 210 is configured to be used with a separate and distinct electrical connector, such as the electrical connector 105 (FIGS. 1A-1E). The current interrupting module 210 includes a connection interface 226 that is configured to electrically and mechanically connect the current interrupting module 210 to the separate and distinct electrical connector.

The current interrupting module 210 also includes a vacuum interrupter 220 that is enclosed within a housing 227. The vacuum interrupter 220 includes a stationary contact 221*a* and a moveable contact 221*b* enclosed in a vacuum bottle 223. The stationary contact 221*a* is at an end of a stationary rod 222*a*, and the moveable contact 221*b* is at an end of a moveable rod 222*b*. The stationary rod 222*a* and the moveable rod 222*b* extend through the vacuum bottle 223. The vacuum bottle 223 is sealed, and an evacuated space is maintained in the vacuum bottle 223. The stationary rod 222*a* and the moveable rod 222*b* may be surrounded by one or more sealing mechanisms such as, for example, O-rings and/or bellows, to maintain the evacuated space within the vacuum bottle 223. The stationary rod 222*a* passes through and end 228*a* of the housing 227 and into the connection interface 226. The moveable rod 222*b* passes through an end 228*b* of the housing 227. Other configurations are possible. For example, in some implementations, the moveable rod 222*b* does not pass through the end 228*b* but is electrically connected to an element (such as an electrical cable) that passes through the end 228*b*.

The stationary contact 221*a*, the stationary rod 222*a*, the moveable contact 221*b*, and the moveable rod 222*b* are made of an electrically conductive material, such as, for example, a metal or a metal alloy. Examples of materials that may be used as the stationary contact 221*a*, the stationary rod 222*a*, the moveable contact 221*b*, and the moveable rod 222*b* include, without limitation, tin, steel, brass, gold, copper, silver, and combinations of such materials.

The current interrupting module 210 also includes a switch control 224 that controls the state of the vacuum interrupter 220. The switch control 224 is any type of device that is capable of driving the moveable rod 221*b*. For example, the switch control 224 may be an actuator (referred to below as the actuator 224). The actuator 224 is coupled to the moveable rod 222*b*. The actuator 224 may be, for example, an electromagnetic actuator or a mechanical actuator. The actuator 224 is coupled to a control system 225. The control system 225 controls the actuator 224 to determine whether and how the actuator 224 moves the moveable rod 222*b*. The actuator 224 is configured to move the moveable rod 222*b* along a path 231 and relative to the stationary contact 221*a*. By moving the moveable rod 222*b*, the moveable contact 221*b* moves relative to the stationary contact 221*a* and the state of the vacuum interrupter 220 is controlled. In the example of FIG. 2, the stationary contact 221*a* and the moveable contact 221*b* are separated and vacuum interrupter 220 is in an open state in which current cannot pass through the vacuum interrupter 220. To change the state of the vacuum interrupter 220, the actuator 224 moves the moveable rod 222*b* until the moveable contact 221*b* is in contact with the stationary contact 221*a*.

Figure 6:
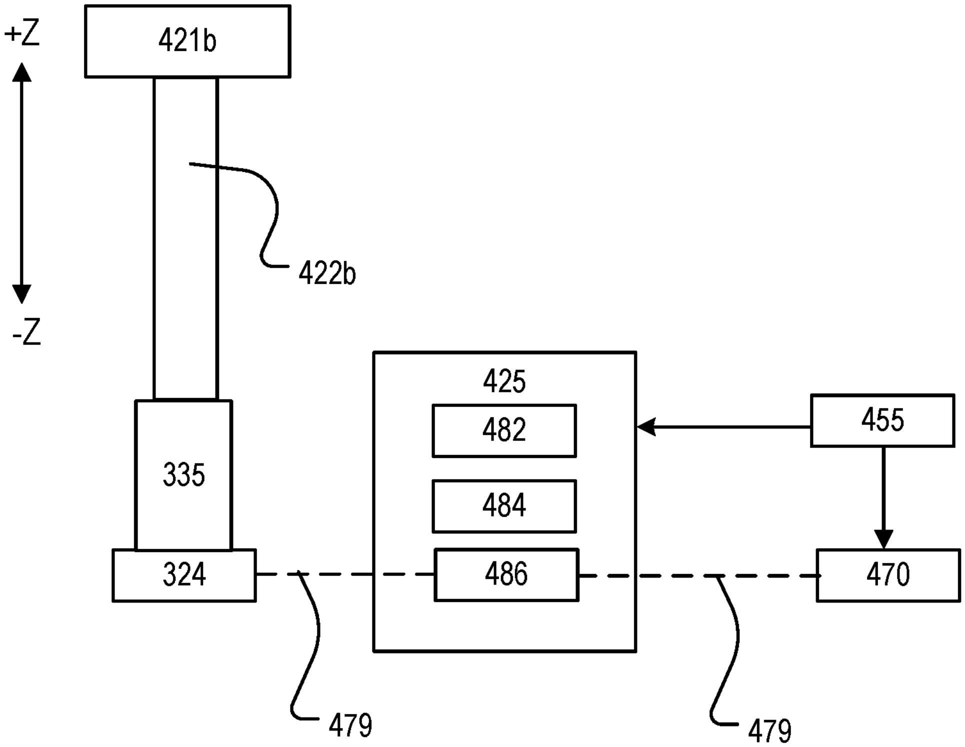
FIG. 6 is a block diagram of an example of a system with a control system.

The control system 225 is any type of control system that is capable of causing the actuator 224 to move the moveable rod 222*b*. In some implementations, the control system 225 is an electronic control system that acts on the actuator 224 by issuing electronic control signals. In some implementations, the control system 225 is a mechanical control system that acts on the actuator 224 via mechanical means. For example, the control system 225 may include a user-controllable shaft that pushes the actuator 224 and moves the moveable rod 222*b*. Moreover, the control system 225 may have an electronic user interface, a mechanical user interface, or mechanical and electronic user interface elements. For example, the control system 225 may include a manual operation handle that allows an operator to move the moveable rod 222*b* by interacting with the manual operation handle. In another example, the control system 225 may include one or more electronic connections that allow the operator to communicate with the control system 225 via electronic commands. FIG. 6 provides an example of an electronic control system 425 that may be used as the control system 225.

The current interrupting module 210 also includes a sensor 270. The sensor 270 may be, for example, a current transformer (CT) or other type of current sensor. The sensor 270 may be a voltage sensor. The sensor 270 is coupled to the control system 225. The sensor 270 is used to monitor the current flowing in the current interrupting module 210.

Figure 3A:
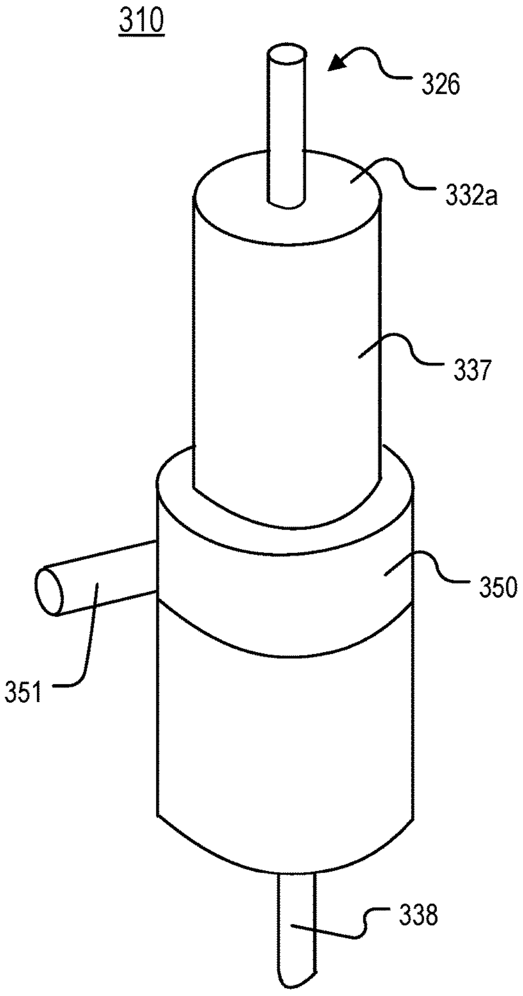
FIG. 3A is a perspective view of another example of a current interrupting module.
Figure 3B:
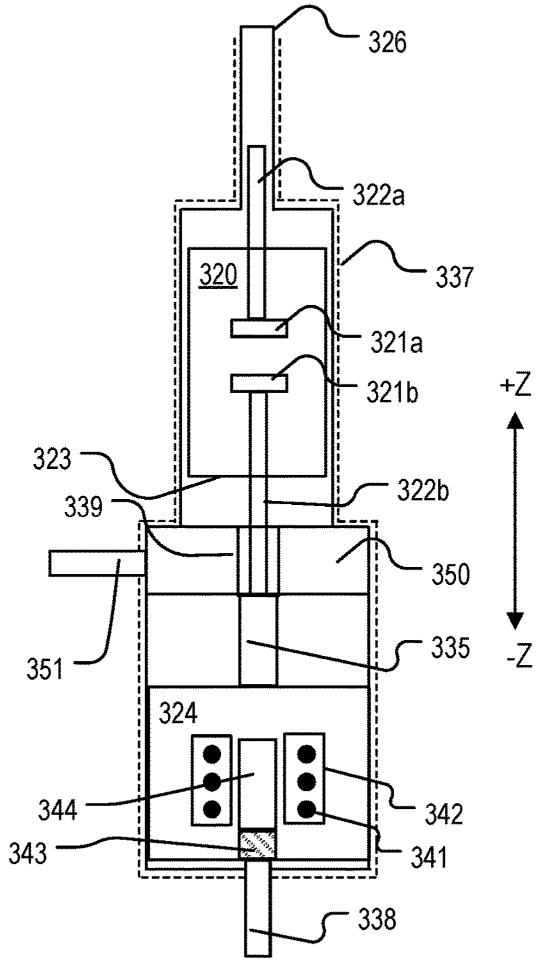
FIG. 3B is a cross-sectional view of the current interrupting module of FIG. 3A.

FIG. 3A is a perspective exterior view of a current interrupting module 310. FIG. 3B is a side-cross sectional view of the current interrupting module 310. The current interrupting module 310 is another example of an implementation of the current interrupting module 110. The current interrupting module 310 is encased in a material 337 (shown with a short dash line style in FIG. 3B). The material 337 may be, for example, a dielectric material such as epoxy.

The current interrupting module 310 includes a vacuum interrupter 320, a current exchange 350, and an electromagnetic actuator 324. The vacuum interrupter 320 is similar to the vacuum interrupter 220 (FIG. 2). The vacuum interrupter 320 includes a stationary contact 321*a* at an end of a stationary rod 322*a* and a moveable contact 321*b* at an end of a moveable rod 322*b*. The stationary contact 321*a* and the moveable contact 321*b* are enclosed in a vacuum bottle 323.

The current exchange 350 includes an input connection 351, and the current exchange 350 is electrically connected to the moveable rod 322*b*. The input connection 351 is accessible from an exterior of the current interrupting module 310. In the example of FIGS. 3A and 3B, the input connection 351 extends radially outward from the current interrupting module 310. The input connection 351 is configured to be electrically connected to an external device or an electrical cable. The current exchange 350 and the input connection 351 are made from electrically conductive materials, such as, for example, metal or a metal alloy. For example, the current exchange 350 and the input connection 351 may be made of copper, gold, silver, and/or brass. The current exchange 350 and the moveable rod 322*b* are physically coupled to each other in any suitable manner that allows the moveable rod 322*b* to move while maintaining the physical connection. For example, the moveable rod 322*b* and the current exchange 350 may be connected with a braided and/or laminated flexible metallic bar. Opposite ends or sides of the flexible metallic mar may be secured to the moveable rod 322*b* and the current exchange 350 by, for example, welding or bolting. The connection between the moveable rod 322*b* and the current exchange 350 may be any electrically conductive material such as, for example, copper or a metallic alloy that includes copper.

The electromagnetic actuator 324 is a device that converts electrical energy into mechanical motion. In the example of FIGS. 3A and 3B, the electromagnetic actuator 324 is implemented as an electromagnetic plunger that includes a coil 341, a magnetic core 342, a spring 343, and a magnetic plunger 344. The magnetic plunger 344 extends along the Z axis and is concentric with the magnetic core 342. When a transient current flows in the coil 341, a magnetic field is formed around the magnetic core 342 and the magnetic plunger 344. The magnetic field produces an interaction between the magnetic core 342 and the magnetic plunger 344, and the plunger 344 moves relative to the magnetic core 342.

The electromagnetic actuator 324 also includes a manual control device 338. The manual control device 338 allows an end-user to manually operate the electromagnetic actuator 324. For example, the end-user may use the manual control device 338 to cause the plunger 344 to move even when a transient current is not flowing in the coil 341. The manual control device 338 is accessible from the exterior of the current interrupting module 310 and is away from the input connection 351 and the connection interface 326. Thus, the manual control device 338 allows the end user to safely change the state of the vacuum interrupter 320.

Any electromagnetic actuator with bi-stable action may be used as the electromagnetic actuator 324. Moreover, although in the example discussed above, the electromagnetic actuator 324 is an electromagnetic actuator, other types of actuators may be used in place of the electromagnetic actuator 324. For example, the electromagnetic actuator 324 may instead be implemented as a hydraulics or pneumatic actuator.

In operational use, when the magnetic plunger 344 moves in the +Z direction and contacts the push rod 335, the push rod 335 moves in the +Z direction through a bore 339, and the moveable rod 322*b* and the moveable contact 321*b* also move in the +Z direction until the stationary contact 321*a* and the moveable contact 321*b* are connected to each other. When the moveable contact 321*b* touches the stationary contact 321*a*, the vacuum interrupter 320 is closed and electrical current can flow between the input connection 351 and the stationary rod 322*a*. When the magnetic plunger 344 moves in the −Z direction, the moveable contact 321*b* and the moveable rod 322*b* also move in the −Z direction. Thus, when the transient current no longer flows in the coil 341, the magnetic plunger 344 moves in the −Z direction, and the moveable contact 321*b* separates from the stationary contact 321*a* to open the vacuum interrupter 320. When the vacuum interrupter 320 is open, current cannot flow from the input connection 351 to the stationary rod 322*a*.

The current interrupting module 310 also includes a connection interface 326 that connects the current interrupting module 310 to a separate and distinct electrical connector (such as the electrical connector 105). The connection interface 326 is a hollow cylinder that extends in the +Z direction from a region 332*a* of the current interrupting module 310. The connection interface 326 mechanically connects to a corresponding interface on the electrical connector. For example, the connection interface 326 may be inserted into the recess 199 at the end 107B of the electrical connector 105. The connection interface 326 and the corresponding interface on the electrical connector may have surface features (such as threads or surface roughness) that encourage a more secure mechanical connection between the connection interface 326 and the electrical connector 105. In some implementations, the connection interface 326 is made of an electrically conductive material such as metal or a metal alloy and is crimped, welded, soldered, or brazed to the electrical connector 105. In some implementations, the connection interface 326 is attached to the electrical connector 105 using an additional device, such as a fastener or an adhesive. Regardless of how the connection interface 326 connects to the end 107B, attaching the connection interface 326 to the end 107B mounts the current interrupting module 310 to the electrical connector 105 and also electrically connects the stationary rod 322*a* to the current path 108. For example, the current path 108 may be inserted into the connection interface 326 until the current path 108 and the stationary rod 322*a* are in physical contact and are thus electrically connected. In another example, the stationary rod 322*a* may extend in the +Z direction beyond the connection interface 326 such that the stationary rod 322*a* makes contact with the current path 108 when the connection interface 326 is connected to the recess 199.

Figure 4A:
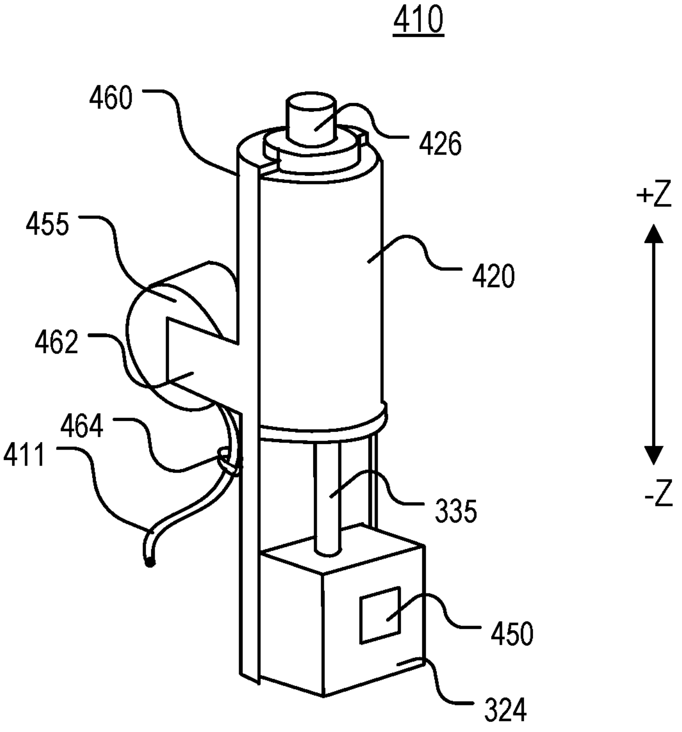
FIG. 4A is a perspective view of another example of a current interrupting module.
Figure 4B:
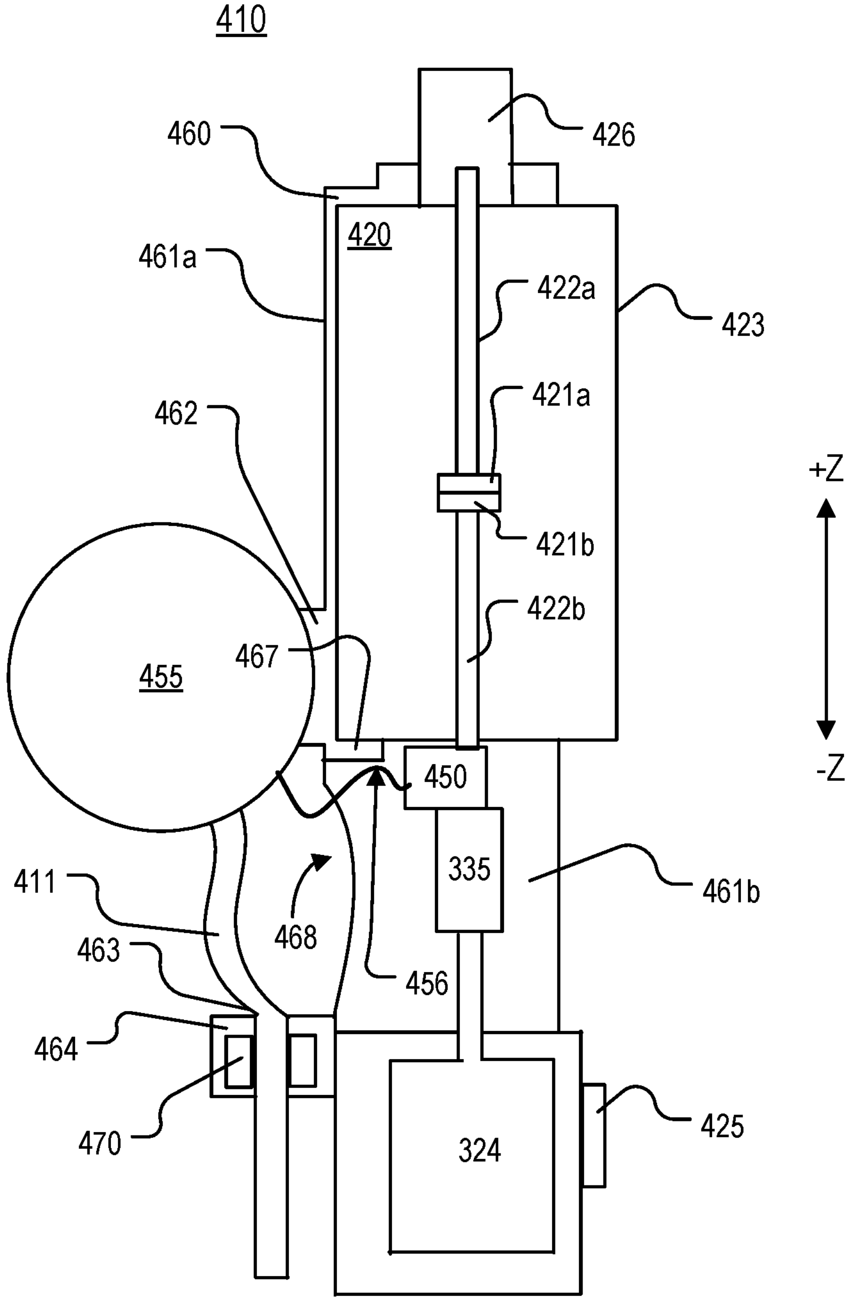
FIG. 4B is a cross-sectional view of the current interrupting module of FIG. 4A.

FIG. 4A is a perspective view of a current interrupting module 410. FIG. 4B is a cross-sectional view of the current interrupting module 410. The current interrupting module 410 is another example implementation of the current interrupting module 110. The current interrupting module 410 may be connected to an electrical connector that lacks a resettable current interrupting device, such as the electrical connector 105 (FIGS. 1A-1E).

The current interrupting module 410 includes a vacuum interrupter 420, the electromagnetic actuator 324, a power apparatus 455, and a control system 425. The various elements of the electromagnetic actuator 324 are shown in FIG. 3B.

The vacuum interrupter 420 is similar to the vacuum interrupter 320. The vacuum interrupter 420 includes a stationary rod 422*a*, a stationary contact 421*a* at an end of the stationary rod 422*a*, a moveable rod 422*b*, a moveable contact 421*b* at an end of the moveable rod 422*b*, a vacuum bottle 423 that contains the contacts 421*a* and 421*b*, and a current exchange 450 that is electrically connected to the moveable rod 422*b*. The current interrupting module 410 may be encased in a housing, such as a dielectric casing or coating.

The control system 425 is coupled to the electromagnetic actuator 324. The control system 425 controls the state of the vacuum interrupter 420 by controlling the electromagnetic actuator 324. For example, the control system 425 causes a current to flow in the coil 341 to control the position of the plunger 344 such that the position of the moveable contact 421*b* relative to the stationary contact 421*a* is also controlled.

The current interrupting module 410 also includes the power apparatus 455, which is electrically connected to the current exchange 450 via a flexible conductor 456. The flexible conductor 456 is any type of flexible electrical conductor that is able to maintain an electrical connection between the power apparatus 455 and the current exchange 450. The flexible conductor 456 may be, for example, a laminated strip of a metal such as a laminated copper strip or a flexible metal wire. The flexible conductor 456 is connected to the current exchange 450 and to the power apparatus 455 by, for example, brazing or soldering. The power apparatus 455 is also electrically connected to the control system 425.

The power apparatus 455 is any device or system that is capable of harvesting electrical power that flows in the current interrupting module 410, storing the harvested power, and providing the stored electrical power to the control system 425. In other words, the power apparatus 455 is configured to provide electrical power to the control system 425 such that the current interrupting module 410 is self-powered and may operate even in the absence of an external power source. The power apparatus 455 may be, for example, a power current transformer.

The power apparatus 455 is also electrically connected to a load-side conductor 411. The load-side conductor 411 is any type of electrical conductor. For example, the load-side conductor 411 may be a copper-braided cable or a copper wire.

The current interrupting module 410 also includes a connection interface 426 that is configured to connect the current interrupting module 410 to a separate and distinct electrical connector (such as the electrical connector 105). The connection interface 426 is an electrically conductive element that extends from the current interrupting module 410 in the +Z direction. The connection interface 426 is electrically connected to the stationary rod 422*a* of the vacuum interrupter 420. To connect the current interrupting module 410 to the electrical connector 105, the connection interface 426 is inserted into the recess 199, which is at the end 107B of the electrical connector 105, and the connection interface 426 makes contact with the current path 108 thereby electrically connecting the current path 108 to the stationary rod 422*a*. The connection interface 426 is shaped and sized to fit into the recess 199 at the end 107B. The connection interface 426 may be held in the recess 199 by an interference fit between the connection interface 426 and an inside of the housing 109; by an external fastening mechanism, such as a band or clamp; or by crimping the end 107B to the connection interface 426.

Figure 5B:
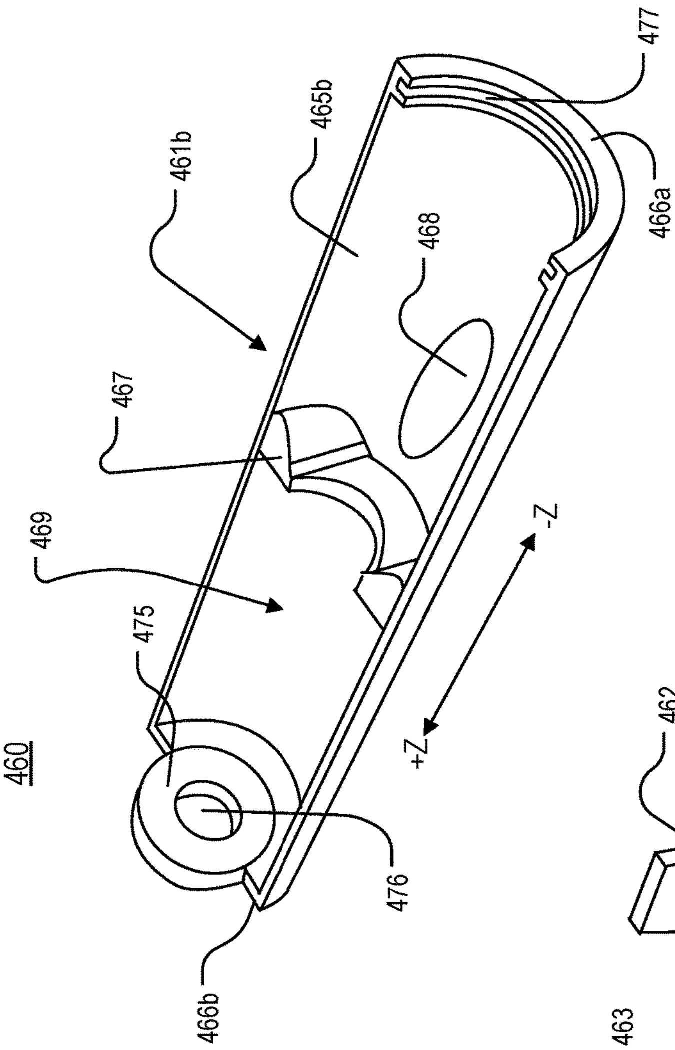
FIG. 5B is a perspective view of an interior region of the support structure of FIG. 5A.
Figure 5A:
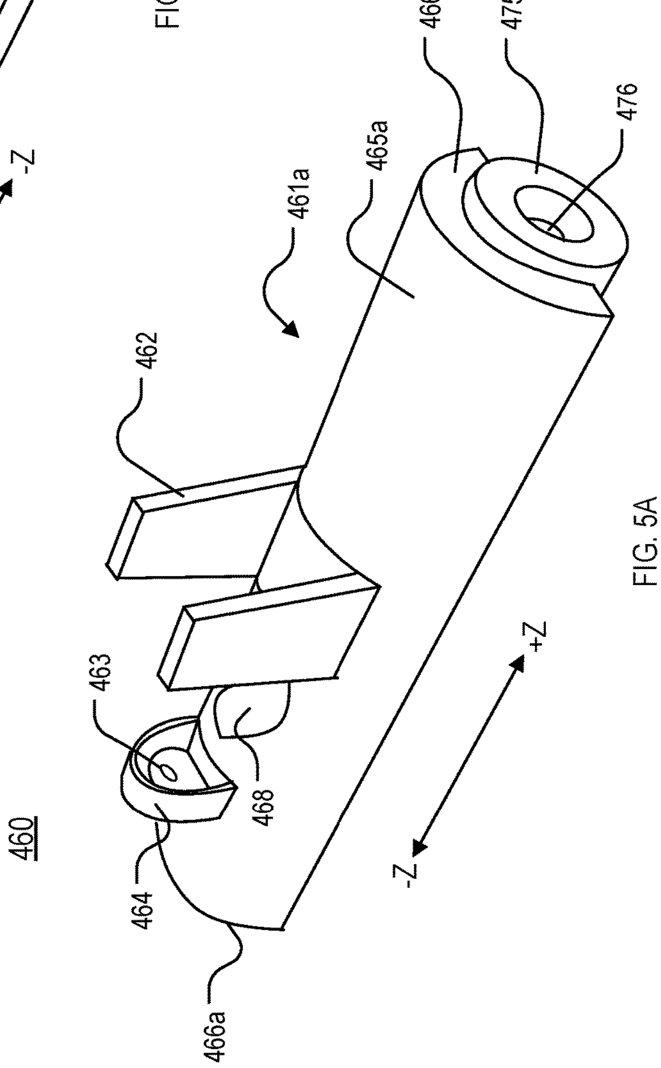
FIG. 5A is a perspective view of an exterior region of an example of a support structure.

Referring also to FIGS. 5A and 5B, the current interrupting module 410 also includes a support structure 460 that holds the vacuum interrupter 420, the actuator 324, the power apparatus 455, and the control system 425. FIG. 5A is a perspective view of the outer region 461*a* of the support structure 460. FIG. 5B is a perspective view an inner region 461*b* of the support structure 460. The support structure 460 is generally a truncated cylinder that has a curved exterior surface 465*a* that extends from a first end 466*a* to a second end 466*b* in the +Z direction. The power apparatus 455 is held in a bracket 462 that extends from the curved exterior surface 465*a*. The power apparatus 455 may be held in the bracket 462 with one or more fasteners such as screws and/or an adhesive.

The support structure 460 also includes a sensor bracket 464. The sensor bracket 464 extends radially outward from the curved exterior surface 465*a*. The sensor bracket 464 defines an opening 463 that passes through the sensor bracket 464 in the Z direction. As shown in FIGS. 4A and 4B, the load-side conductor 411 passes through the opening 463 in a sensor bracket 464. The sensor bracket 464 also holds a sensor system 472 (FIG. 4B). The sensor system 472 is any type of sensor or any collection of sensors that are able to measure electrical current or a quantity that is related to electrical current in the load-side conductor 411. The sensor system 472 may be, for example, a Rogowski coil. In some implementations, the sensor system 472 includes a resistive element that is electrically connected to the load-side conductor 411 and a voltage sensor that measures the voltage across the resistive element.

The sensor system 472 produces an indication of the measured electrical quantity. The sensor system 472 is also coupled to the control system 425, and the control system 425 uses the indication of the current flowing in the load-side conductor 411 to control the actuator 324.

The support structure 460 also includes an opening 468. The opening 468 passes through the support structure 460 from the curved exterior surface 465*a* to an inner wall 465*b*. The inner wall 465*b* is also curved and extends from the end 466*a* to the end 466*b*. The support structure 460 also includes an inner bracket 467 that extends from the inner wall 465*b*. The inner bracket 467 is configured to hold the vacuum interrupter 420 in a space 469 that is between the inner bracket 467 and the end 466*b*. The support structure 460 also includes an annulus 475 at the end 466*b*. The annulus 475 defines an opening 476. The opening 476 is sized to accommodate the connection interface 426. When the vacuum interrupter 420 is held in the support structure 460, the connection interface 426 extends through the opening 476 in the +Z direction. The support structure 460 also includes features 477, which are formed in the inner wall 465*b* at the end 466*a*. The features 477 increase the creepage length of the support structure 460. In the example shown in FIG. 5B, the features are rib-like structures that increase the creepage length of the support structure 560.

The support structure 460 may be made of any rigid material that is electrically insulating and maintains its material properties in a high-temperature environment (such as the temperatures that may exist in the current interrupting module 410 during a fault condition). For example, the support structure 460 may be made of a rigid, molded polymer or plastic, an epoxy, or an epoxy-grade material. The support structure 460 may be made of a thermoset polymer, such as glass-filled PPA (Polyphthalamide) or PBT (Polybutylene Terephthalate). Thermoset polymers are quite rigid and maintain their strength at the high temperatures that may exist inside the support structure. The temperature inside the support structure 460 within the assembled electrical connector 410 may reach 120 to 130 degrees Celsius. The support structure 460 may be a single molded piece of rigid plastic.

Under ordinary operating conditions, the vacuum interrupter 420 is closed, and the connection interface 426 is connected to the electrical connector 105. Electrical current flows in the current path 108 of the electrical connector 105, the connection interface 426, the stationary rod 422*a*, the stationary contact 421*a*, the moveable contact 421*b*, the moveable rod 422*b*, the current exchange 450, the flexible conductor 456, the power apparatus 455, and the load-side conductor 411. The sensor system 472 measures one or more properties of the electrical current that flows in the load-side conductor 411 and provides an indication of the measured properties to the control system 425. Additionally, the power apparatus 455 harvests electrical power as electrical current passes through the power apparatus 455 and stores the harvested electrical power (for example, in a capacitor). When the vacuum interrupter 420 is closed, the control system 425 and the sensor system 470 may be powered by the electricity that flows in the current interrupting module 410 or by the power apparatus 455.

When the vacuum interrupter 420 is open, electrical current does not flow in the current interrupting module 410. The power apparatus 455 provides power to the control system 425 and/or the sensor system 470.

Referring also to FIG. 6, the control system 425 controls the state of the vacuum interrupter 420. FIG. 6 is a block diagram that shows the interaction between the control system 425, the actuator 324, the sensor system 470, and the power apparatus 455. In FIG. 6, the solid lines between the power apparatus 455 and the sensor system 470 and between the power apparatus 455 and the control system 425 indicate that the power apparatus 455 provides electrical power to the control system 425 and the sensor system 470. The control system 425 communicates with the actuator 324 and the sensor system 470 via data paths 479 that are shown in dashed lines. The data paths 479 are any type of device capable of carrying signals that include information. For example, the data paths 479 may electrical wires that carry electrical signals, and/or a transceiver that sends and receives optical or electrical signals.

The control system 425 includes an electronic processing module 482, an electronic storage 484, and an input/output (I/O) interface 486. The electronic processing module 482 includes one or more electronic processors. The electronic processors of the module 482 may be any type of electronic processor and may or may not include a general purpose central processing unit (CPU), a graphics processing unit (GPU), a microcontroller, a field-programmable gate array (FPGA), Complex Programmable Logic Device (CPLD), and/or an application-specific integrated circuit (ASIC).

The electronic storage 484 may be any type of electronic memory that is capable of storing data, and the electronic storage 484 may include volatile and/or non-volatile components. The electronic storage 484 and the processing module 482 are coupled such that the processing module 482 may access or read data from the electronic storage 484 and may write data to the electronic storage 484. The electronic storage 484 also may store data received from the actuator 324, the sensor system 470, the power apparatus 455, and/or the vacuum interrupter 420. For example, the electronic storage 484 may store data collected by the sensor system 470 over time. The electronic storage 484 also may store information and data related to the operation of the vacuum interrupter 420. For example, the electronic storage 484 may store a current threshold associated with a fault condition. The electronic storage 484 also may store instructions as, for example, a computer program or function, that when executed by the electronic processing module 482 analyzes data from the sensor system 470 to determine whether or not a fault condition is present. If the data from the sensor system 470 indicates that a current flowing in the load-side conductor 411 exceeds the current threshold, the control system 425 declares that a fault condition is present. The electronic storage 484 also stores instructions that, when executed by the electronic processing module 482, controls a current source to control current flow in the coil 341 of actuator 324 such that the moveable contact 321*b* separates from the stationary contact 321*a* when a fault condition is declared or detected. The electronic storage 484 also may store instructions that cause the vacuum interrupter 320 to change state in response to other inputs and/or other information, such as an input from an end-user or a command from a remote station or from a manual operating handle (such as the manually operating device 338 shown in FIGS. 3A and 3B).

The I/O interface 486 is any interface that allows a human operator and/or an autonomous process to interact with the control system 425. The I/O interface 486 may include, for example, a display, audio input and/or output (such as speakers and/or a microphone), a serial or parallel port, a Universal Serial Bus (USB) connection, and/or any type of network interface, such as, for example, Ethernet. The I/O interface 486 also may allow communication without physical contact through, for example, an IEEE 802.11, Bluetooth, or a near-field communication (NFC) connection. The control system 425 may be, for example, operated, configured, modified, or updated through the I/O interface 486.

The I/O interface 486 is also connected to the data paths 479 and allows the control system 425 to communicate with the actuator 324. For example, the control system 425 sends the actuator 324 commands through the I/O interface 486 that cause the actuator 324 to move the push rod 335 and moveable rod 422*b* to thereby open or close the vacuum interrupter 420. The control system 425 also may receive data and information about the vacuum interrupter 420 from the actuator 324 via the I/O interface 486. For example, the control system 425 may receive status messages from the actuator 324 indicating whether or not the moveable rod 422*b* moved in response to a command signal via the I/O interface 486.

The I/O interface 486 also may allow the control system 425 to communicate with systems external to and remote from the current interrupting module 410. For example, the I/O interface 486 may include a communications interface that allows communication between the control system 425 and a remote station using, for example, the Supervisory Control and Data Acquisition (SCADA) protocol or another services protocol. The remote station may be any type of station through which an operator is able to communicate with the control system 425 without making physical contact with the control system 425. For example, the remote station may be a computer-based work station, a smart phone, remote control, tablet, or a laptop computer that connects to the control system 425 via a services protocol, or a remote control that connects to the control system 425 via a radio-frequency signal.

FIG. 7 is a block diagram of a system 700 that includes the source 102 and the load 103. The system 700 illustrates a legacy loadbreak elbow connector 705 that is retrofitted with a current interrupting module 710.

The system 700 includes an equipment cabinet 791. The cabinet 791 includes a plurality of walls, including a wall 790 that has an electrically insulating bushing 792. The bushing 792 is made of an electrically insulating material, such as rubber. The distribution path 104 passes through the bushing 792.

The system 700 also includes the loadbreak elbow connector 705. The loadbreak elbow connector 705 includes a connecting bushing 701 that mechanically connects the loadbreak elbow connector 705 to the bushing 792. For example, the connecting bushing 701 may be a rubber protrusion that fits inside of the bushing 792 and is held in the bushing 792, for example, by an interference fit or with an adhesive. When the connecting bushing 701 and the bushing 792 are connected, the distribution path 104 is electrically connected to a current path 708 of the elbow connector 705. The current path 708 includes a non-resettable current interrupting device 706. In the example shown in FIG. 7, the non-resettable current interrupting device 706 is an MOV or a fuse.

The system 700 also includes the current interrupting module 710. The current interrupting module 710 may be any of the current interrupting modules 110, 210, 310, or 410 discussed above. The current interrupting module 710 includes a connection interface 726 that connects the current interrupting module 710 to the elbow connector 705. The current interrupting module 710 includes a resettable current interrupting device 720 that is electrically connected to the current path 708 and to a load-side cable 711. The load-side cable 711 is electrically connected to the load 103.

Under ordinary operating conditions, the resettable current interrupting device 720 is closed, and the electrical connector 705 and the current interrupting module 710 provide an electrical connection between the source 102 and the load 103. The resettable current interrupting device 720 allows control of the connection between the source 102 and the load 103. For example, the resettable current interrupting device 720 opens in the presence of a fault condition and/or in response to manual user input such that the load 103 is disconnected from the distribution path 104 without having to activate the non-resettable current interrupting device 706. Thus, it is not necessary to replace the elbow connector 705 after the fault condition is resolved.

The implementations discussed above and other implementations are within the scope of the claims. The above implementations are provided as examples, and other implementations are possible and are also within the scope of the claims. For example, system 700 is shown with the current interrupting module 710 connected to the loadbreak elbow connector 705. However, the current interrupting module 710 may be connected to other connectors. Moreover, the loadbreak elbow connector 705 or the connector 105 may be implemented in other ways. For example, the loadbreak elbow connector 705 or the electrical connector 105 may be implemented with a current path that does not include any type of interrupting device.

Furthermore, the above examples show a single phase. However, the current interrupting modules 110, 210, 310, 410, and 710 may be used in a multi-phase system. For example, in a three-phase system, the cabinet 791 may contain three loadbreak elbow connectors, each of which is connected to an instance of the current interrupting module 710.

What is claimed is:

1. A current interruption module comprising:

a resettable switching apparatus associated with operating states, the operating states comprising at least a first operating state that prevents current flow in the resettable switching apparatus and a second operating state that allows current flow in the resettable switching apparatus; and a switch control configured to control the operating state of the resettable switching apparatus;

wherein the current interruption module is configured to be attached to and removed from a separate and distinct electrical connector, and the current interruption module further comprises a connection interface that extends from an end of the resettable switching apparatus and is configured to electrically connect the resettable switching apparatus to a current path of the separate and distinct electrical connector and to mechanically connect the current interruption module to the separate and distinct electrical connector.

2. The current interruption module of claim 1, further comprising a dielectric body that encases the resettable switching apparatus and the switch control.

3. The current interruption module of claim 1, wherein the resettable switching apparatus comprises a vacuum interrupter.

4. The current interruption module of claim 3, wherein the switch control comprises an actuator configured to move a moveable contact of the vacuum interrupter relative to a stationary contact of the vacuum interrupter to control the operating state of the vacuum interrupter.

5. The current interruption module of claim 4, wherein the actuator comprises an electromagnetic actuator and a push rod, and the push rod is connected to the electromagnetic actuator and the moveable contact.

6. The current interruption module of claim 1, further comprising a power apparatus configured to provide electrical energy to the switch control.

7. The current interruption module of claim 6, further comprising a support structure configured to hold the switch control, the resettable switching apparatus, and the power apparatus.

8. The current interruption module of claim 7, wherein the support structure comprises a rigid support structure.

9. The current interruption module of claim 1, further comprising an electronic control configured to control the switch control.

10. The current interruption module of claim 9, wherein the electronic control is configured to communicate with an electronic device that is separate from the current interruption module.

11. The current interruption module of claim 9, further comprising a current sensor configured to measure a property of electrical current that flows in the resettable switching apparatus.

12. The current interruption module of claim 1, further comprising a support structure, and wherein the resettable switching apparatus and the switch control are attached to the support structure.

13. A system comprising:

an electrical connector comprising:

a mechanical interface at a first end of the electrical connector, the mechanical interface configured to mechanically attach the electrical connector to a bushing;

a current path that passes through the electrical connector from the first end to a second end of the electrical connector; and a fuse mechanism on the current path; and wherein the system further comprises a current interruption module comprising:

a resettable switching apparatus associated with operating states, the operating states comprising at least a first operating state that prevents current flow in the resettable switching apparatus and a second operating state that allows current flow in the resettable switching apparatus; and a switch control configured to control the operating state of the resettable switching apparatus;

wherein the current interruption module is configured to be attached to and removed from the electrical connector, and the current interruption module further comprises: a connection interface that extends from an end of the resettable switching apparatus and is configured to electrically connect the resettable switching apparatus to a current path of the electrical connector and to mechanically connect the current interruption module to the electrical connector.

14. The system of claim 13, wherein the fuse mechanism comprises one or more metal oxide varistors (MOVs).

15. The system of claim 13, wherein the resettable switching apparatus comprises a vacuum interrupter.

16. The system of claim 13, wherein the electrical connector comprises a load break electrical connector.

17. The system of claim 16, wherein the load break electrical connector comprises an elbow electrical connector.

18. The system of claim 13, wherein the resettable switching apparatus further comprises:

a power apparatus configured to obtain electrical energy from the current path and to provide electrical energy to the switch control.

19. The system of claim 18, wherein the resettable switching apparatus further comprises an electronic control configured to control the switch control apparatus.

20. The system of claim 19, further comprising a current sensor configured to measure a property of electricity in the current path, and wherein the electronic control is further configured to control the switch control based on the measured property.

* * * * *